(No Model.)

A. C. SPRINGER.
CAR BRAKE.

No. 244,495. Patented July 19, 1881.

Witnesses
Geo. H. Strong
S. H. Nourse

Inventor
Amos C. Springer
By Dewey & Co
Attys

N. PETERS, Photo-Lithographer, Washington, D. C.

UNITED STATES PATENT OFFICE.

AMOS C. SPRINGER, OF CANDALARA, NEVADA.

CAR-BRAKE.

SPECIFICATION forming part of Letters Patent No. 244,495, dated July 19, 1881.

Application filed June 16, 1881. (No model.)

*To all whom it may concern:*

Be it known that I, AMOS C. SPRINGER, of Candalara, county of Esmeralda, State of Nevada, have invented an Improved Brake Attachment; and I hereby declare the following to be a full, clear, and exact description thereof.

My invention relates to certain improvements in brakes, and it is intended more especially to be applied to railroad-cars which are coupled together to form a train.

The object of the invention is to provide a means for braking all the cars of a train at the same time by a single operation, this object being accomplished by the application of my invention or attachment to a common form of brake now in use, which brakes each car independently of the other.

The invention consists in a number of extensible connecting-rods attached to each car and operating-chains which themselves operate pulleys upon each car and wind up chains which operate the brakes, all of which will hereinafter fully appear, reference being made to the accompanying drawings, in which—

Figure 1:
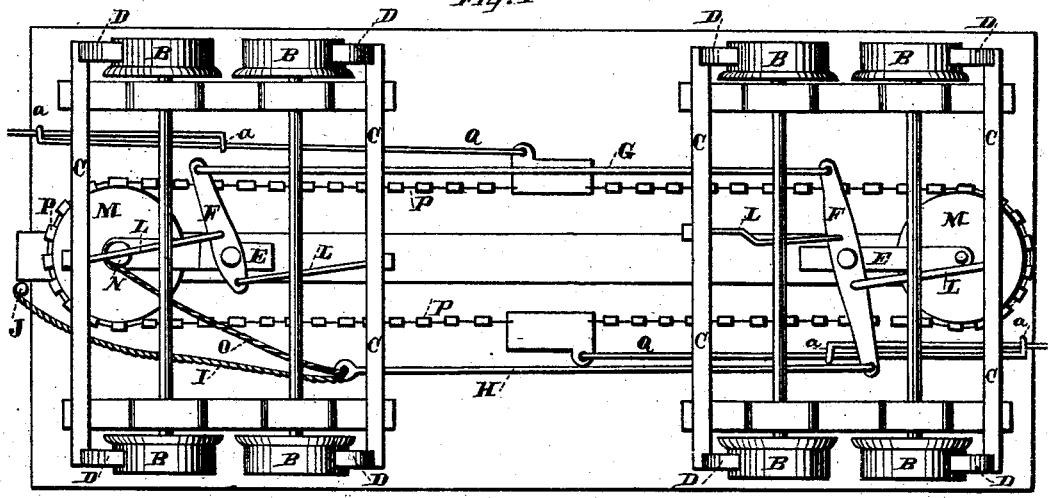
Figure 2:
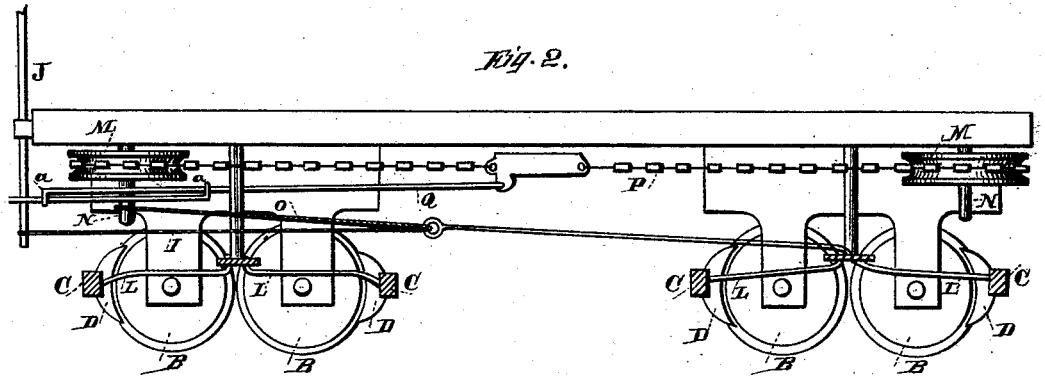
Figure 3:
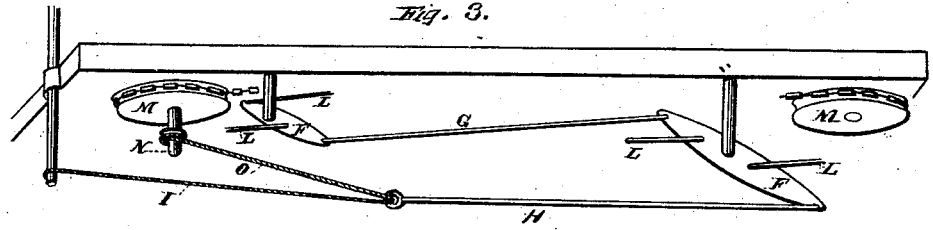

Figure 1 is a bottom view of my invention. Fig. 2 is a longitudinal section. Fig. 3 shows the working parts.

Let B represent the wheels of a car. C represents the brake-beams, and D the brakes. E E represent supports on which are journaled the double levers F F. G is a rod or bar connecting one end of one lever with the end of the other. H is a rod connecting the other end of the first lever with a chain, I, the other end of which is attached to and is adapted to be wound upon the shaft or spindle J, which passes up through appropriate guides to the top of the car and is surmounted with the crank-wheel in the usual manner. L L are rods or bars having one end secured to the double levers F F on each side of their pivot-points and the other ends attached to the brake-beams C. All these parts constitute the ordinary braking device now in use, and nothing new is herein claimed with respect thereto, this explanation being given to explain my invention, which is applied to it.

The operation of this device shown accomplishes the object of putting the brakes on all the wheels of a car at once by turning the crank-wheel. This winds up the chain I, drawing the rod H and the lever F, with which it is connected, and in doing so applies both brakes of one truck to the wheels. At the same time it draws the rod G, which draws the other lever F, and thus applies both brakes to the wheels of the other truck. This is accomplished upon each separate car.

The object of my invention is to apply these brakes to every car of a train at the same moment and by a single operation.

Under the car are the horizontal pulleys M M, one at each end of the car, and journaled upon short shafts N, one of which is extended, and has attached to it a chain, O, the other end of which is attached to the rod H. Around these pulleys M M, which have grooved faces to receive it, is a chain, P. Attached to the chain P, on each side, are rods Q, rendered extensible in any appropriate manner, (here shown as consisting of two rods having loops *a* on their ends, embracing each other and adapted to slide back and forth,) whereby, when not in use, they may be closed up under each car and supported on appropriate hooks. When connection with each car is to be made these rods are drawn out from under the car at both ends, and have their outer ends attached to a similar chain to the chain P upon the car in front and the car behind. When, therefore, it is desired to apply the brakes by means of this device, if the rod Q be drawn forward from in front, it will act upon the chain P, and through the other rods upon the other cars act upon all the chains P of each car and revolve the pulleys M. The pulley M on each car, which has the extended shaft adapted to wind up the chain O, will wind up said chain and draw the rod H, thus applying the brakes as effectively as by the ordinary method.

It will be seen that this invention in no wise interferes with the ordinary form of brake attachment, so that either can be applied at will. It can be operated by the engineer or a man in the last car, and by drawing upon the rods on different sides both can operate it at once.

It is obvious that this device could be applied to forms of brakes different from the one here shown by attaching it to the operating-rod.

Having thus described my invention, what I claim as new, and desire to secure by Letters Patent, is—

1. The means for operating and applying brakes upon an entire train by one operation, consisting of the horizontal pulleys M M, extended shaft N, adapted to wind up the chain O, connected with the brake-rod H, and extensible connecting-rods Q, as specified, all operating in the manner and for the purpose substantially as herein described.

2. In a car having a braking device consisting of the brakes D, brake-beams C, rods L L, levers F F, connecting-rod G, operating-rod H, chain I, and shaft J, and in combination therewith, the braking device consisting of the horizontal pulleys M M, chain O, connected with one of said pulleys and with the rod H, main chain P, and extensible connecting-rods Q, whereby the brakes may be applied to a whole train by one operation, when arranged and constructed substantially as herein described.

In witness whereof I have hereunto set my hand.

AMOS C. SPRINGER.

Witnesses:
M. E. McCARTHY,
G. R. A. BROWNE.